United States Patent [19]

Hammons

[11] 4,225,781
[45] Sep. 30, 1980

[54] SOLAR TRACKING APPARATUS

[75] Inventor: Burrell E. Hammons, Albuquerque, N. Mex.

[73] Assignee: The United States of America as represented by the United States Department of Energy, Washington, D.C.

[21] Appl. No.: 15,256

[22] Filed: Feb. 26, 1979

[51] Int. Cl.³ ............................ F24J 3/02; G01J 1/20
[52] U.S. Cl. ................................. 250/203 R; 126/425; 250/209; 250/237 R; 356/141; 356/152
[58] Field of Search ............................. 126/424, 425; 250/203 R, 237 R, 239, 209; 356/141, 152, 400; 318/577, 640; 49/25; 160/5

[56] References Cited

U.S. PATENT DOCUMENTS

| | | | |
|---|---|---|---|
| 3,780,966 | 12/1972 | Newcomb et al. | 250/237 R |
| 3,917,942 | 11/1975 | McCray | 126/425 |
| 4,031,385 | 6/1977 | Zerlaut | 126/425 |
| 4,041,307 | 8/1977 | Napoli | 250/203 R |
| 4,135,493 | 1/1979 | Kennedy | 126/425 |
| 4,146,784 | 3/1979 | Yekutieli | 126/425 |
| 4,147,154 | 4/1979 | Lewandowski | 126/425 |
| 4,179,612 | 12/1979 | Smith | 250/203 R |

*Primary Examiner*—James C. Yeung
*Assistant Examiner*—Daniel O'Connor
*Attorney, Agent, or Firm*—James E. Denny; Dean E. Carlson; Dudley W. King

[57] ABSTRACT

The invention relates to a solar tracking device which tracks the position of the sun using paired, partially-shaded photocells. Auxiliary photocells are used for initial acquisition of the sun and for the suppression of false tracking when the sun is obscured by clouds.

4 Claims, 4 Drawing Figures

1

SOLAR TRACKING APPARATUS

BACKGROUND OF THE INVENTION

This invention relates to apparatus for maintaining a solar collector in a desired or optimum attitude with respect to the sun.

Many solar energy collecting devices work most efficiently when positioned generally upwardly, perpendicular to the rays of the sun. Because the position of the sun varies both daily and seasonally, various prior art devices have been used to position the collector, ranging from manual adjustment, clockwork adjustment, photoelectric sensors, and combinations of the above. For example, U.S. Pat. No. 3,177,367 would use side-mounted photocells to control the amount of illumination behind a set of louvers. U.S. Pat. No. 3,370,293 would have a planar array of sensors located either within or without a cylinder and optionally movable with respect to the cylinder for use in a direction finder; U.S. Pat. No. 3,311,748 employs a movable light refracting slot in an instrument for determining the position of the sun. U.S. Pat. No. 3,423,589 has paired photocells to trace patterns; U.S. Pat. No. 3,478,219 has a pyramidal optical prism and multiple photocells to provide both fine and coarse tracking of the sun; U.S. Pat. No. 3,200,905 utilizes multiple rings of detectors having varying field of view in tracking devices; U.S. Pat. No. 3,739,247 has photocells and a reference pattern to set and article in a predetermined planar position; U.S. Pat. No. 3,917,942 uses a fixed photocell quadrant sensor for controlling the position of louvers; U.S. Pat. No. 4,031,385 teaches a clock-driven override system in combination with a photovoltaic suntracker to compensate for periods of partial cloud cover; U.S. Pat. No. 4,041,307 would use a combination of a lens-photocell system and a shadow photocell system for fine and coarse tracking of the sun; and U.S. Pat. No. 4,103,151 uses photocells spaced around the periphery of a solar collector for the aiming of that collector.

The prior art does not teach a simple photoelectric sun tracker, which will track the sun accurately, to begin acquisition when the solar collector is more than 90° from its desired position, and not be fooled into falsely tracking the edge of a cloud passing over the sun.

SUMMARY OF THE INVENTION

In view of difficulties and disadvantages such as noted above, it is an object of this invention to provide a novel apparatus for tracking the position of the sun.

It is further object of this invention to provide a reliable, inexpensive, and accurate means for aligning the solar collector with the sun.

It is another object of this invention to provide a solar tracker which is able to acquire the sun when more than 90° out of alignment.

It is still further object of this invention to provide a solar tracker which minimizes false tracking when the sun is obscured by clouds.

The invention comprises a base and what may be termed as a "shade horn" or support means mounted on the base with photocells mounted on the base, on the sides of the shade horn and on the top of the shade horn. The shade horn may be an inverted truncated pyramid that partially and equally shades the base-mounted photocells when the apparatus is in alignment with the sun. The side-mounted photocells aid in the initial acquisition of the sun while the top-mounted photocell aids in rejecting spurious tracking information.

DESCRIPTION OF THE PREFERRED EMBODIMENT

Figure 1:
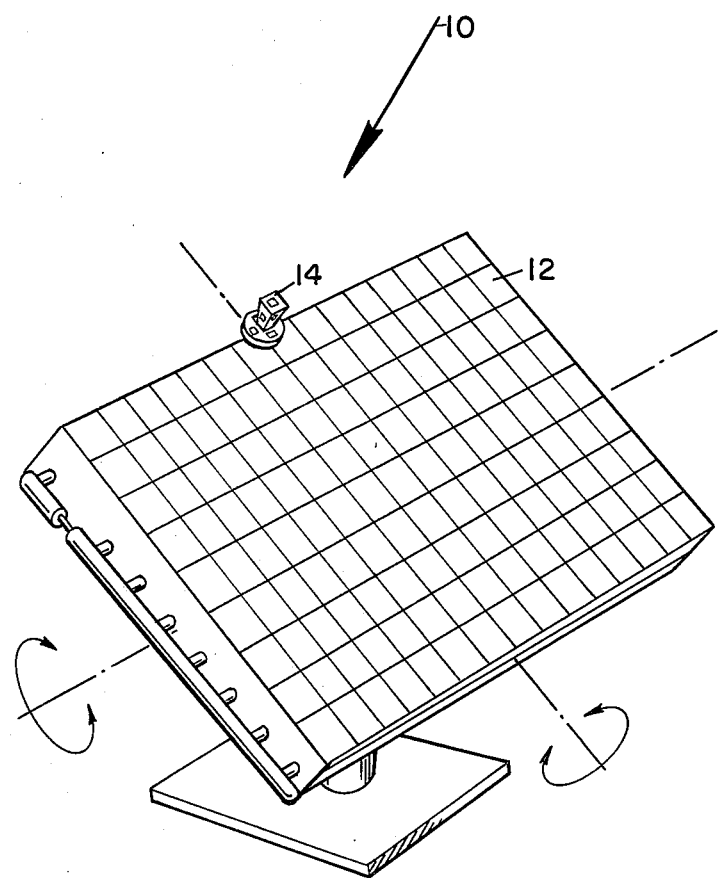
FIG. 1 illustrates the solar tracker apparatus of the present invention mounted on or associated with a representative solar collector.

Reference is now made to FIG. 1 which illustrates the solar tracking apparatus or device 14 mounted on a solar collector 12 for optimum orientation alignment with the sun's rays 10. The solar collector is movable about two axes, for example, elevation and azimuth. The collector may be any of the type which gives increased performance when aligned generally perpendicular to the sun's rays, e.g., a flat plate collector, a photovoltaic array, or a collector with lenses or mirrors for concentrating the sun's energy. The solar tracker 14 is mounted or otherwise coupled or associated with the collector such that a change in alignment or orientation of the collector produces a corresponding change in alignment of the tracker with the sun, thereby producing an error signal which causes re-alignment or orientation of the collector and tracker. The error signal, through appropriate circuitry, may cause re-alignment of the collector through the operation of motors, such as a fraction horsepower electric motor, for example a Dayton No. 2Z797 1/15 HP gearmotor.

Figure 2:
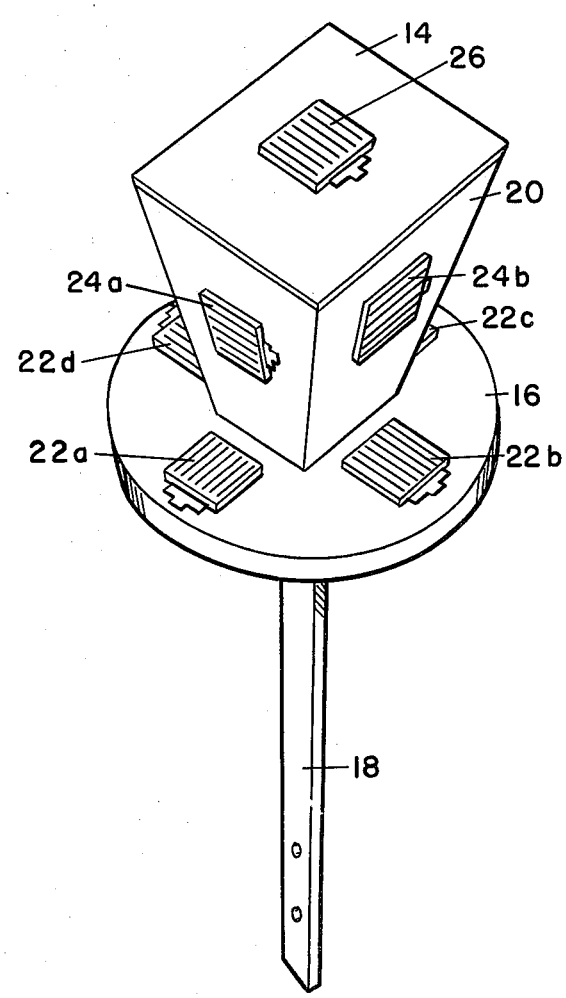
FIG. 2 illustrates the solar tracker in perspective view.

Reference is now made to FIG. 2 which illustrates in perspective the solar tracker 14 which comprises a base member 16, a shade horn or support means 20, a mount 18, and associated photocells. The photocells may be any of the type that produce a voltage, electric current, or a change in electrical resistance when illuminated by the sun. Such silicon photovoltaic cells as 2cm$^2$, 10 ohm-cm single crystal cells by OCLI have been found to be satisfactory.

In an exemplary embodiment, the base 16 is a disc about 14 inches in diameter and is affixed to the mount 18 which is a simple bar which may in turn be mounted on the solar collector. The base serves as a platform for carrying photocells 22a, 22b, 22c, and 22d and for mounting support or shade horn 20.

Shade horn 20 is shown in the shape or configuration of an inverted truncated pyramid. For convenience, the wide portion of the inverted pyramid may be thought of as the top and the narrow portion of the pyramid may be thought of as the bottom. In the exemplary embodiment, the bottom of the pyramid, which may be mounted in the center of the base 16, is a square with sides of about 0.7 inches. The top of the pyramid, on which is carried photocell 26, is shown as a square with sides of about 2.7 inches. On each wall of the pyramid is mounted a photocell 24a, 24b, 24c, and 24d. The altitude of the exemplary pyramid is about 4 inches.

Figure 3:
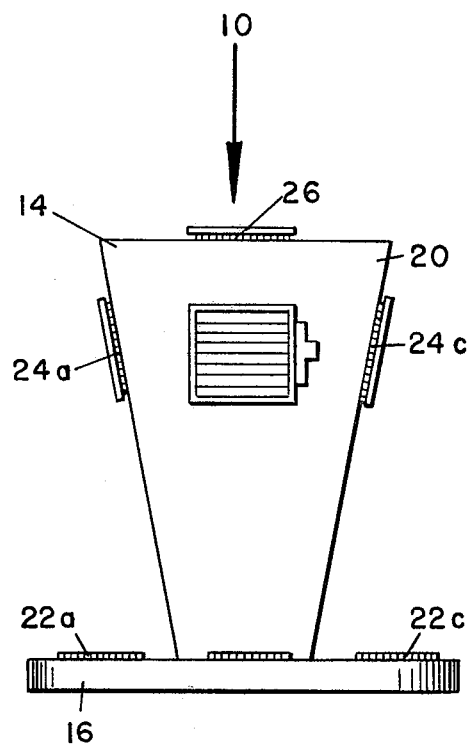
FIG. 3 illustrates the solar tracker in side view.
Figure 4:
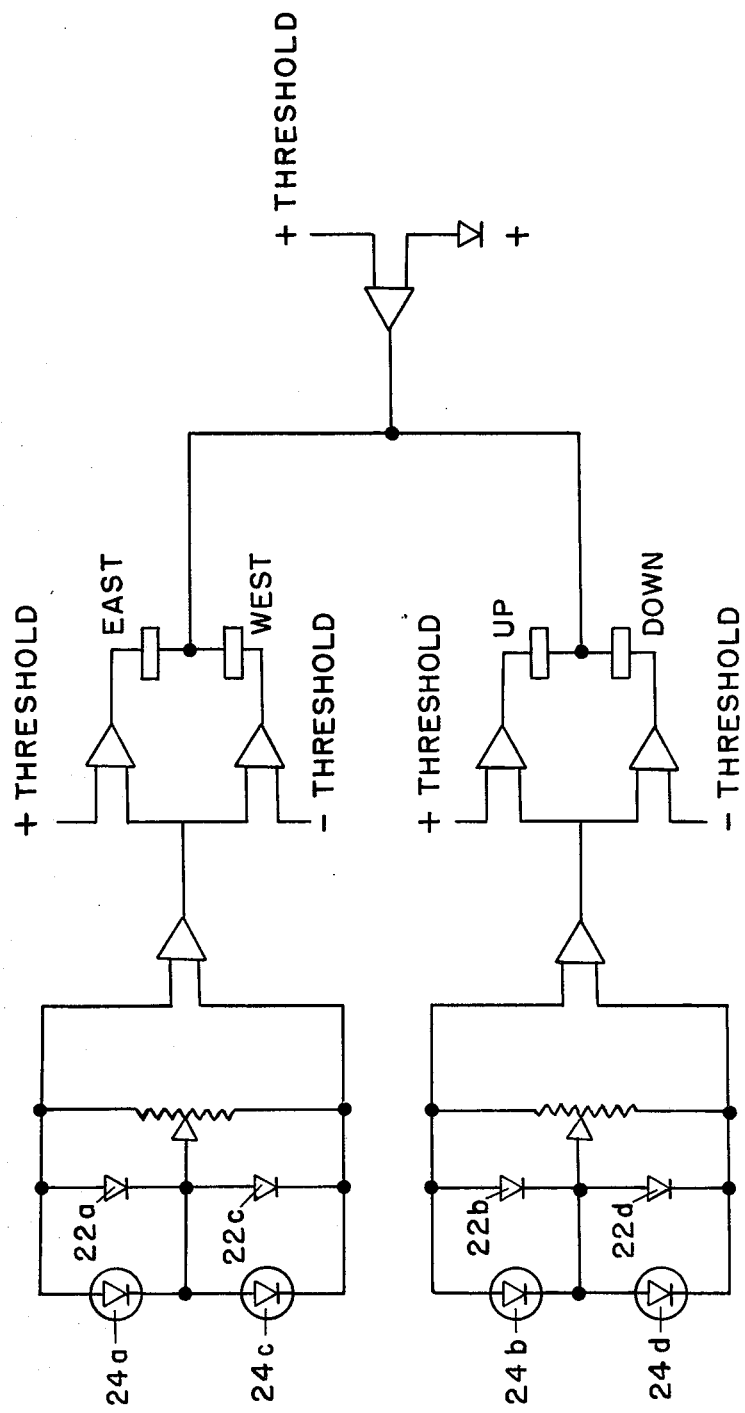
FIG. 4 illustrates an electrical circuit suitable for use with the solar tracker.

Reference is now made to FIG. 3 which illustrates the solar tracker 14 in side view. When, as shown, the base 16 is essentially perpendicular to the rays of the sun 10, and the top of the horn faces the sun, each of the photocells 22a and 22c is equally shaded by the shade from shade horn 20. If, on the other hand, the solar tracker were skewed to the right, photocell 22c would be more shaded than photocell 22a which would give rise to a voltage difference which may be used as an error signal to correct the position of the collector through appropriate circuitry, for example, as in the simplified circuitry of FIG. 4.

When the solar tracker first acquires the sun, for example, at sunrise, the collector may be facing far from the desired position and all of photocells 22a, 22b, 22c, and 22d could be shaded by the base 16. In this situation, no error signal would be produced and the sun tracker would fail to track the sun. Prior art trackers have relied on either clockwork or manual setting to overcome this difficulty. In the present invention, photocells 24a, 24b, 24c, and 24d are mounted on the sides of the pyramid and are wired in parallel with photocells 22a, 22b, 22c, and 22d. When the tracker is far from the desired position, (even when the sun is behind the tracker) one of these side-mounted photocells will be illuminated, creating an error signal and causing the tracker to be steered toward the sun. When the tracker is facing the sun, the four side-mounted photocells are all shaded and do not participate in tracking. To minimize spurious signals from these side-mounted photocells when "seeing" reflected light from nearby objects, they may be covered with optical filters. A suitable optical filter has 10% transmission of light, such as a neutral density light filter from the Oriel Corporation.

When the sun is temporarily obscured by a cloud, the brightest object in the sky may be the edge of the cloud. As the edge of the cloud moves, a tracker may needlessly hunt for the sun. Prior art trackers have attempted to solve this problem through the use of clockwork which would tell the tracker of the approximate position of the sun. These devices require periodic setting of the clock to correct for accumulated error and to allow for seasonal variation. With the present apparatus, photocell 26, mounted on the top of the shade horn 20, compensates for temporary disturbances such as when a cloud covers the sun. When the amount of illumination of this photocell drops below a preset level, the error signals from the other photocells may be prevented from causing tracking to occur. This may also be used to prevent useless tracking of the moon during night hours.

The various features and advantages of the invention are thought to be clear from the foregoing descriptions. However, various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. Apparatus for orienting a solar collector with respect to the sun comprising: a base member, support means projecting upwardly from said base member, a first photocell carried by said support means and spread above said base member for unobstructed disposition to the sun, a first plurality of photocells each disposed toward the sun carried by said base member and circumferentially spaced from each other about said support means and said first photocell, a second plurality of photocells carried by said support means located intermediate said first photocell and the photocells carried by said base member and inclined toward the latter and away from said first photocell for shading thereof from the sun when said first photocell is in essentially maximum orientation with respect to the sun, each photocell of said first plurality of photocells being partially and equally shaded from the sun by at least one of said first photocell or support means when said first photocell is in said essentially maximum orientation, and electrical means for receiving signals from the photocell and for generating steering signals responsive to shadings and exposures of the photocells.

2. The apparatus of claim 1, wherein said support means is of inverted truncated pyramid configuration.

3. The apparatus of claim 1, wherein said second plurality of photocells are covered with optical filters.

4. The apparaus of claim 1 including steering means for recieving said steering signals and for changing the orientation of said solar collector.

* * * * *